United States Patent
Uenoyama et al.

(10) Patent No.: US 11,977,204 B2
(45) Date of Patent: May 7, 2024

(54) METHOD FOR PRODUCING OPTICAL ELEMENT AND OPTICAL ELEMENT

(71) Applicant: HAMAMATSU PHOTONICS K.K., Hamamatsu (JP)

(72) Inventors: Soh Uenoyama, Hamamatsu (JP); Hiroki Kamei, Hamamatsu (JP); Kazuyoshi Hirose, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 376 days.

(21) Appl. No.: 17/226,662

(22) Filed: Apr. 9, 2021

(65) Prior Publication Data

US 2021/0318466 A1 Oct. 14, 2021

(30) Foreign Application Priority Data

Apr. 13, 2020 (JP) .................. 2020-071532

(51) Int. Cl.
*G02F 1/1335* (2006.01)
*G02B 1/00* (2006.01)
*G02B 3/08* (2006.01)
*G02F 1/1333* (2006.01)

(52) U.S. Cl.
CPC .............. *G02B 1/002* (2013.01); *G02B 3/08* (2013.01); *G02F 1/133345* (2013.01); *G02F 1/133507* (2021.01); *G02F 1/133516* (2013.01)

(58) Field of Classification Search
CPC ............ G02F 1/1335; G02F 1/133507; G02F 1/133516; G02F 1/133528; G02F 1/133548; G02F 1/133526; G02F 1/1333; G02F 1/133345; G02F 1/133302; G02F 1/133305; G02B 1/002; G02B 3/08
See application file for complete search history.

(56) References Cited

U.S. PATENT DOCUMENTS

| | | | |
|---|---|---|---|
| 2015/0288318 A1 | 10/2015 | Guler et al. | |
| 2018/0341090 A1* | 11/2018 | Devlin | G03F 7/40 |
| 2021/0396910 A1* | 12/2021 | Zhu | G02B 1/002 |

FOREIGN PATENT DOCUMENTS

| | | |
|---|---|---|
| JP | 2013-120873 A | 6/2013 |
| JP | 2018-536204 A | 12/2018 |
| WO | WO-2017/091738 A1 | 6/2017 |

OTHER PUBLICATIONS

Manuel Decker et al., "High-Efficiency Dielectric Huygens' Surfaces," Adv. Optical Mater, 2015, vol. 3, pp. 813-820.
Philippe Lalanne et al., "Metalenses at visible wavelengths: past, present, perspectives", pp. 1-17.

* cited by examiner

*Primary Examiner* — Thoi V Duong
(74) *Attorney, Agent, or Firm* — Faegre Drinker Biddle & Reath LLP (57) ABSTRACT

A method for producing an optical element includes: disposing a joint layer on a substrate; forming a first portion and a second portion in a second surface of the joint layer; and forming a plurality of structural bodies, which are made of a dielectric, on the second surface of the joint layer. The joint layer has a first surface facing the substrate, and the second surface located on a side opposite the first surface. The first portion is covered with a resist layer, and the second portion is exposed from the resist layer. After the dielectric is laminated on at least the second portion, the resist layer is removed to form the plurality of structural bodies on the second surface.

14 Claims, 6 Drawing Sheets

METHOD FOR PRODUCING OPTICAL ELEMENT AND OPTICAL ELEMENT

TECHNICAL FIELD

The present invention relates to a method for producing an optical element and an optical element.

BACKGROUND

A known optical element has a microstructure on the surface. For example, Japanese Unexamined Patent Publication No. 2018-536204 describes an optical element including a metamaterial made of a dielectric. The metamaterial of the optical element is a plurality of microstructural bodies made of the dielectric on a substrate.

SUMMARY

Japanese Unexamined Patent Publication No. 2018-536204 describes that, in the production of the optical element, a resist layer patterned on the substrate is provided, and a dielectric layer covering the resist layer is formed. After a first portion in which the resist layer is provided and a second portion in which the resist layer is not provided are formed on the substrate, the dielectric is laminated, thereby the dielectric is not laminated on the first portion of the substrate and is laminated on the second portion of the substrate. For this reason, when the resist layer is removed, the dielectric remains only in the second portion of the substrate. As a result, the structural bodies made of the dielectric are formed on the substrate.

In order to produce a desired optical action on incident light, it is desired to realize an optical element in which various microstructures using a dielectric are formed. The inventors of the present application have found that in a case where a desired microstructure is formed on the substrate by the above structural bodies, when the resist layer is removed, the structure formed by the plurality of structural bodies collapses. For example, it has been observed that in a case where the microstructure is directly formed on the substrate by a plurality of structural bodies having a column shape and made of a dielectric, when the resist layer is removed, defects such as separation of the structural body from the substrate and the falling of the structural body are generated.

An object of one aspect of the present invention is to provide a method for producing an optical element in which various microstructures using a dielectric can be realized. An object of another aspect of the present invention is to provide an optical element having a configuration where a desired microstructure using a dielectric can be realized.

According to one aspect of the present invention, there is provided a method for producing an optical element, the method including: forming a joint layer on a substrate; forming a resist layer on a second surface of the joint layer to form a first portion and a second portion in the second surface; forming a dielectric layer that covers the second portion and is in contact with the resist layer; and forming a plurality of structural bodies, which are made of a dielectric, on the second surface of the joint layer. The joint layer has a first surface facing the substrate, and the second surface located on a side opposite the first surface. The first portion is covered with the resist layer, and the second portion is exposed from the resist layer. The dielectric is deposited on at least the second portion in a state where the resist layer is provided on the second surface, to form the dielectric layer. After the dielectric layer is formed, the resist layer is removed to form the plurality of structural bodies on the second surface.

In the one aspect, the joint layer is formed on the substrate, and the plurality of structural bodies made of the dielectric are formed on the second surface of the joint layer. In this case, when the resist layer is removed, as compared to when the plurality of structural bodies are directly formed on the substrate, the collapse of a structure formed by the plurality of structural bodies can be further suppressed. The further the collapse of the structure formed by the plurality of structural bodies is suppressed, the further the reliability and the production throughput of the optical element are improved. Therefore, according to the production method, while both the reliability and the production throughput of the optical element produced are achieved, various microstructures using the dielectric in the optical element can be realized.

In the one aspect, each of the structural bodies may be formed in a column shape extending from the second surface in a first direction intersecting the second surface. In this case, while the reliability and the production throughput of the optical element produced are secured, various microstructures according to a desired optical performance can be realized.

In the one aspect, each of the structural bodies may be formed such that a maximum length of each of the structural bodies in a second direction along the second surface is 200 nm or less. In this case, while the reliability and the production throughput of the optical element produced are secured, various microstructures according to a desired optical performance can be realized.

In the one aspect, each of the structural bodies may be formed such that a ratio of a maximum length of each of the structural bodies in a second direction along the second surface to a maximum length of the structural body in a first direction intersecting the second surface is from 0.06 to 0.40. In this case, while the reliability and the production throughput of the optical element produced are secured, various microstructures according to a desired optical performance can be realized.

In the one aspect, the plurality of structural bodies may be formed to be two-dimensionally arranged on the second surface. A metamaterial may be formed by the plurality of structural bodies and the joint layer on which each of the plurality of structural bodies is provided. In the metamaterial, the joint layers on which the structural bodies adjacent to each other are provided may be formed to be continuous with each other. In this case, the collapse of the structure formed by the plurality of structural bodies is easily suppressed.

In the one aspect, the substrate may be made of quartz.

In the one aspect, the joint layer may be made of at least one of hafnium dioxide, titanium dioxide, silicon dioxide, silicon nitride, silicon, and gallium arsenide. The dielectric may include at least one of hafnium dioxide, titanium dioxide, silicon dioxide, silicon nitride, silicon, and gallium arsenide. In this case, the collapse of the structure of the plurality of structural bodies is further suppressed, and the reliability and the production throughput are further improved.

In the one aspect, the joint layer and the structural body may be made of the same material. In this case, the collapse of the structure formed by the plurality of structural bodies is more easily suppressed, and the reliability and the production throughput are further improved.

According to another aspect of the present invention, there is provided an optical element including: a substrate; and a metamaterial formed on the substrate. The metamaterial includes a joint layer and a plurality of structural bodies. The joint layer is disposed on the substrate, and has a first surface facing the substrate, and a second surface located on a side opposite the first surface. The plurality of structural bodies are disposed on the second surface of the joint layer, and are made of a dielectric.

In the aspect, the joint layer is disposed on the substrate, and the plurality of structural bodies made of the dielectric are disposed on the second surface of the joint layer. According to the configuration, the collapse of a structure formed by the plurality of structural bodies is further suppressed than in a configuration where the plurality of structural bodies are directly disposed on the substrate. The further the collapse of the structure formed by the plurality of structural bodies is suppressed, the further the reliability and the production throughput of the optical element are improved. Therefore, the optical element has a configuration where a desired microstructure using the dielectric can be realized while both the reliability and the production throughput are achieved.

In the aspect, each of the structural bodies may have a column shape extending from the second surface in a first direction intersecting the second surface. In this case, while the reliability and the production throughput are secured, a desired optical performance can be realized.

In the aspect, a maximum length of each of the structural bodies in a second direction along the second surface may be 200 nm or less. In this case, while the reliability and the production throughput are secured, a desired optical performance can be realized.

In the aspect, a ratio of a maximum length of each of the structural bodies in a second direction along the second surface to a maximum length of the structural body in a first direction intersecting the second surface may be from 0.06 to 0.40. In this case, while the reliability and the production throughput are secured, a desired optical performance can be realized.

In the aspect, the plurality of structural bodies may be two-dimensionally arranged on the second surface. The joint layers on which the structural bodies adjacent to each other are provided may be continuous with each other. In this case, while the reliability and the production throughput are secured, a desired optical performance can be realized.

In the aspect, the substrate may include quartz.

In the aspect, the joint layer may include at least one of hafnium dioxide, titanium dioxide, silicon dioxide, silicon nitride, silicon, and gallium arsenide. Each of the structural bodies may include at least one of hafnium dioxide, titanium dioxide, silicon dioxide, silicon nitride, silicon, and gallium arsenide. In this case, the collapse of the structure formed by the plurality of structural bodies is further suppressed, and the reliability and the production throughput are further improved.

In the aspect, the joint layer and the structural body may include the same material. In this case, the collapse of the structure formed by the plurality of structural bodies is further suppressed, and the reliability and the production throughput are further improved.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Hereinafter, an embodiment of the present invention will be described in detail with reference to the accompanying drawings. Incidentally, in the description, the same components or components having the same function are denoted by the same reference signs, and duplicated description will be omitted.

Figure 1:
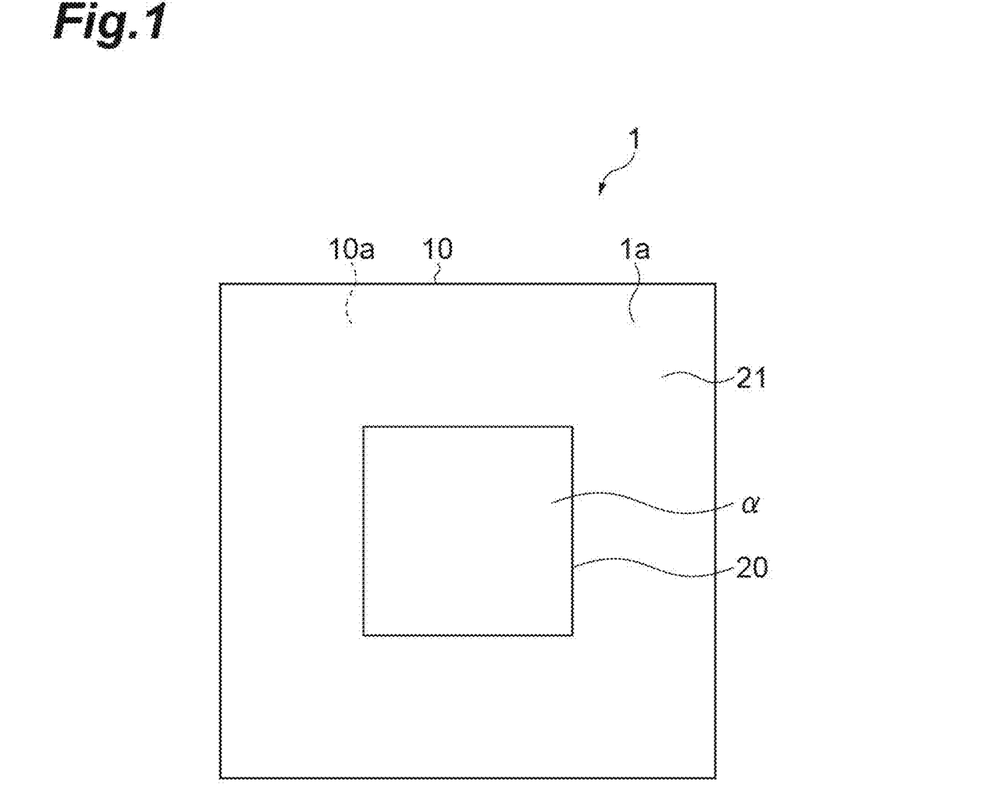
FIG. 1 is a schematic plan view of an optical element in the present embodiment.
Figure 2:
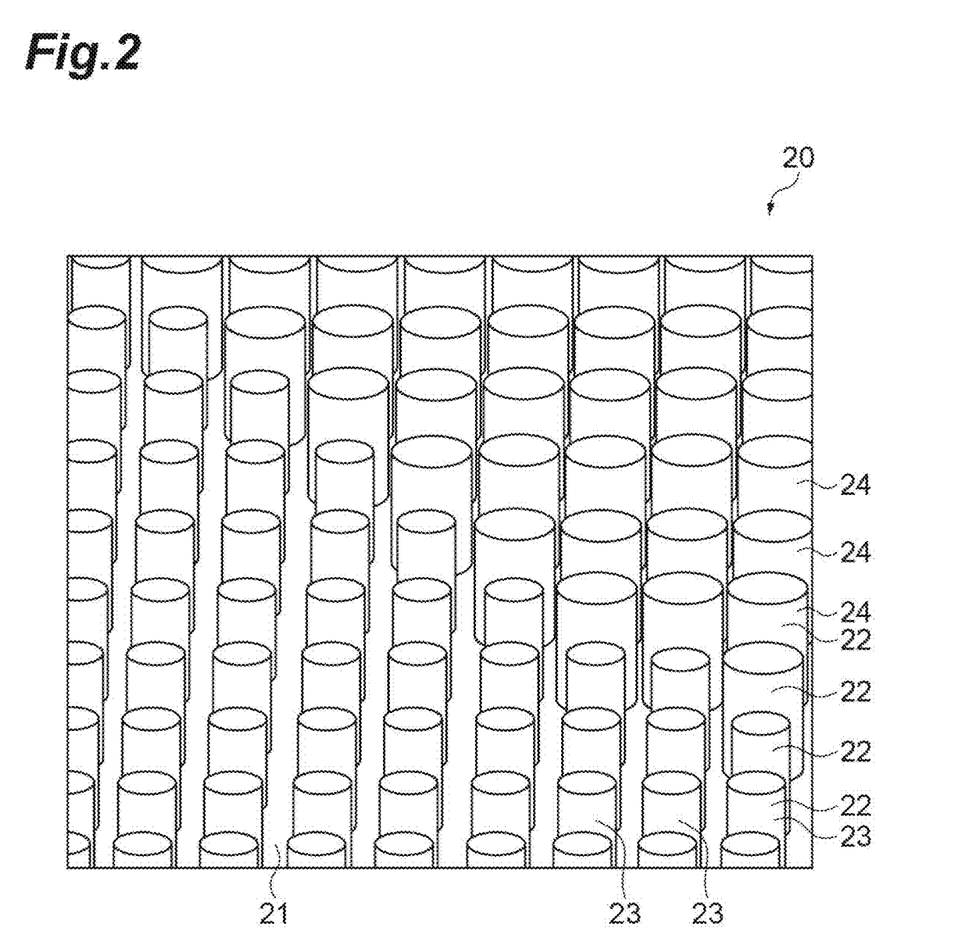
FIG. 2 is an enlarged perspective view of the optical element.
Figure 3:
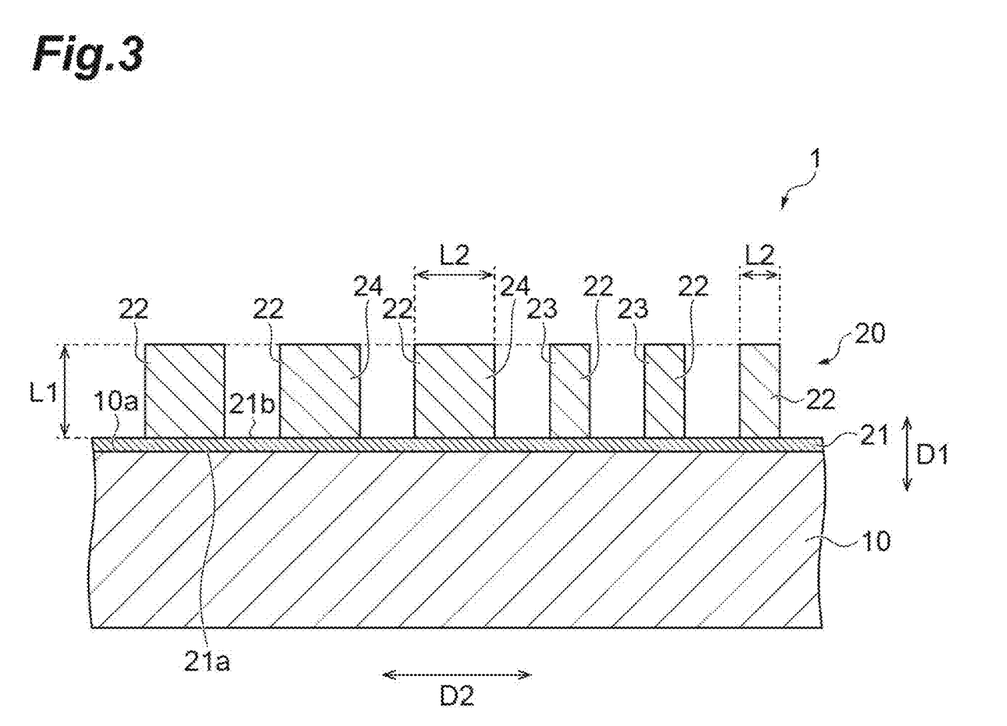
FIG. 3 is an enlarged cross-sectional view of the optical element.

First, a configuration of an optical element in the present embodiment will be described with reference to FIGS. 1 to 3. FIG. 1 is a schematic plan view of the optical element in the present embodiment. An optical element 1 has a surface 1a on which an electromagnetic wave is incident. The optical element 1 produces a desired optical action on the incident electromagnetic wave. For example, the optical element 1 has a desired optical performance for the incident electromagnetic wave in terms of transmittance, reflectivity, refractive index, and the like. For example, the optical element 1 is configured to have a desired optical performance for an electromagnetic wave having a wavelength of 200 nm to 2,000 nm. The optical element 1 is, for example, a lens having a focal length of 500 μm for an electromagnetic wave having a wavelength of 266 nm.

The optical element 1 includes a substrate 10 and a metamaterial 20. The optical element 1 includes the metamaterial 20 in at least a portion on which the above electromagnetic wave is incident on the surface 1a. The optical element 1 produces the above desired optical action on the incident electromagnetic wave in at least the portion in which the metamaterial 20 is provided. FIG. 2 is an enlarged perspective view of the portion of the optical element 1, in which the metamaterial 20 is disposed. FIG. 3 is an enlarged cross-sectional view of the portion of the optical element 1, in which the metamaterial 20 is disposed.

The substrate 10 has a main surface 10a. In the present embodiment, the substrate 10 has transparency for the above electromagnetic wave to be incident on the optical element 1. For example, the substrate 10 has transparency for an electromagnetic wave having a wavelength of 200 nm to 2,000 nm. In the present specification, "having transparency" refers to having a light transmittance of at least approximately 80%. The substrate 10 includes, for example, quartz as a material. For example, the substrate 10 includes quartz glass. The main surface 10a is a flat surface.

The metamaterial 20 has an artificial microstructure. The metamaterial 20 forms a dielectric metasurface. The metamaterial 20 optically acts on the incident electromagnetic wave due to the structure of the metamaterial 20. The metamaterial 20 is provided on the main surface 10a. The metamaterial 20 includes a joint layer 21 and a plurality of structural bodies 22. In the present embodiment, as illustrated in FIG. 1, the metamaterial 20 is provided in a region α having a rectangular shape on the main surface 10a of the substrate 10. In the present embodiment, the region α is a part of the main surface 10a. The region α is a region in which the plurality of structural bodies 22 are disposed as viewed in a direction D1 orthogonal to the main surface 10a. The region α is, for example, a 320 μm square.

The joint layer 21 is disposed on the main surface 10a. The joint layer 21 has a first surface 21a facing the main surface 10a of the substrate 10, and a second surface 21b located on a side opposite the first surface 21a. In the present embodiment, the first surface 21a of the joint layer 21 is in contact with the main surface 10a. The first surface 21a and the second surface 21b are flat surfaces. The first surface 21a and the second surface 21b are parallel to each other. The joint layer 21 includes, for example, at least one of hafnium dioxide, titanium dioxide, silicon dioxide, silicon nitride, silicon, and gallium arsenide.

In the present embodiment, the joint layer 21 is formed of a layer that is integrally formed on the main surface 10a of the substrate 10. The joint layer 21 is one continuous layer. As a modification example of the present embodiment, the joint layer 21 may be formed of a plurality of layers that are disposed on the main surface 10a to be separated from each other.

In the present embodiment, for example, the joint layer 21 is disposed on the entire surface of the main surface 10a including the outside of the region α. The metamaterial 20 is formed by a part of the joint layer 21 and the plurality of structural bodies 22 that are located in the region α. As a modification example of the present embodiment, the joint layer 21 may be disposed only in the region α. The thickness of the joint layer 21 is, for example, 30 nm.

The plurality of structural bodies 22 are made of a dielectric. The plurality of structural bodies 22 are disposed on the second surface 21b of the joint layer 21. The plurality of structural bodies 22 are in contact with the second surface 21b of the joint layer 21. The metamaterial 20 produces various optical actions on the incident electromagnetic wave according to the structure of the plurality of structural bodies 22. In other words, the plurality of structural bodies 22 are configured to produce a desired optical action on the incident electromagnetic wave. The plurality of structural bodies 22 include, for example, at least one of hafnium dioxide, titanium dioxide, silicon dioxide, silicon nitride, silicon, and gallium arsenide. In the present embodiment, the plurality of structural bodies 22 and the joint layer 21 include the same material.

The plurality of structural bodies 22 are two-dimensionally arranged on the second surface 21b of the joint layer 21. In the present embodiment, the plurality of structural bodies 22 are provided in the region α described above as viewed in the direction D1 orthogonal to the main surface 10a.

Each of the structural bodies 22 is in contact with the second surface 21b of the joint layer 21 formed by one continuous layer. In the present embodiment, the joint layers 21 on which the structural bodies 22 adjacent to each other are provided are continuous with each other. As a modification example of the present embodiment, the joint layers 21 on which the structural bodies 22 adjacent to each other are provided may be separated from each other. In the modification example, in the direction D1, a side surface of the structural body 22 and the joint layer 21 may be formed to be flush with each other, or a step may be provided between the side surface of the structural body 22 and the joint layer 21.

Each of the structural bodies 22 extends from the second surface 21b of the joint layer 21 in the direction D1 intersecting the second surface 21b. Each of the structural bodies 22 extends in the direction D1 intersecting the main surface 10a of the substrate 10. In the present embodiment, the direction D1 is orthogonal to the second surface 21b and the main surface 10a. Each of the structural bodies 22 has, for example, a column shape. As illustrated in FIGS. 2 and 3, each of the structural bodies 22 has, for example, a circular column shape. In the present embodiment, each of the structural bodies 22 stands upright with respect to the second surface 21b. The plurality of structural bodies 22 may include structural bodies 23 and 24 having shapes different from each other. A direction D2 intersects the direction D1. The direction D2 is along the main surface 10a of the substrate 10. In the present embodiment, the direction D2 is parallel to the second surface 21b and the main surface 10a, and is orthogonal to the direction D1. When the direction D1 is a first direction, the direction D2 is a second direction.

A maximum length L1 of each of the structural bodies 22 in the direction D1 is, for example, from 1 nm to 2,000 nm. A maximum length L2 of each of the structural bodies 22 in the direction D2 along the second surface 21b is, for example, 200 nm or less. The maximum length L2 is, for example, from 1 nm to 200 nm. When the maximum length L2 is, for example, from 30 nm to 200 nm, the formation of each of the structural bodies 22 is more easily realized. The ratio of the maximum length L2 of each of the structural bodies 22 in the direction D2 to the maximum length L1 of the structural body 22 in the direction D1 is, for example, from 0.06 to 0.40. In the present embodiment, it is assumed that an electromagnetic wave having a wavelength of 266 nm is incident on the optical element 1. The maximum length L1 is 500 nm, the maximum length L2 of each of the structural bodies 23 and 24 is from 80 nm to 120 nm, and the interval between the plurality of structural bodies 22 is 160 nm. The interval between the plurality of structural bodies 22 means the interval between the geometric centers of the structural bodies 22 as viewed in the direction D1.

The structural body 23 and the structural body 24 have, for example, a circular column shape. The structural body 23 and the structural body 24 are different from each other, for example, in terms of the maximum length L2 in the direction D2 along the second surface 21b. The maximum length L2 of each of the structural bodies 23 and 24 in the direction D2 is the diameter of a bottom surface. When the bottom surfaces of the structural bodies 23 and 24 have an elliptical shape, the direction D2 is a minor axis direction. When the bottom surfaces of the structural bodies 23 and 24 have a rectangular shape, the direction D2 is a short side direction. When the bottom surfaces of the structural bodies 23 and 24 have an elongated shape, the direction D2 is a direction orthogonal to an elongated direction.

Figure 4:
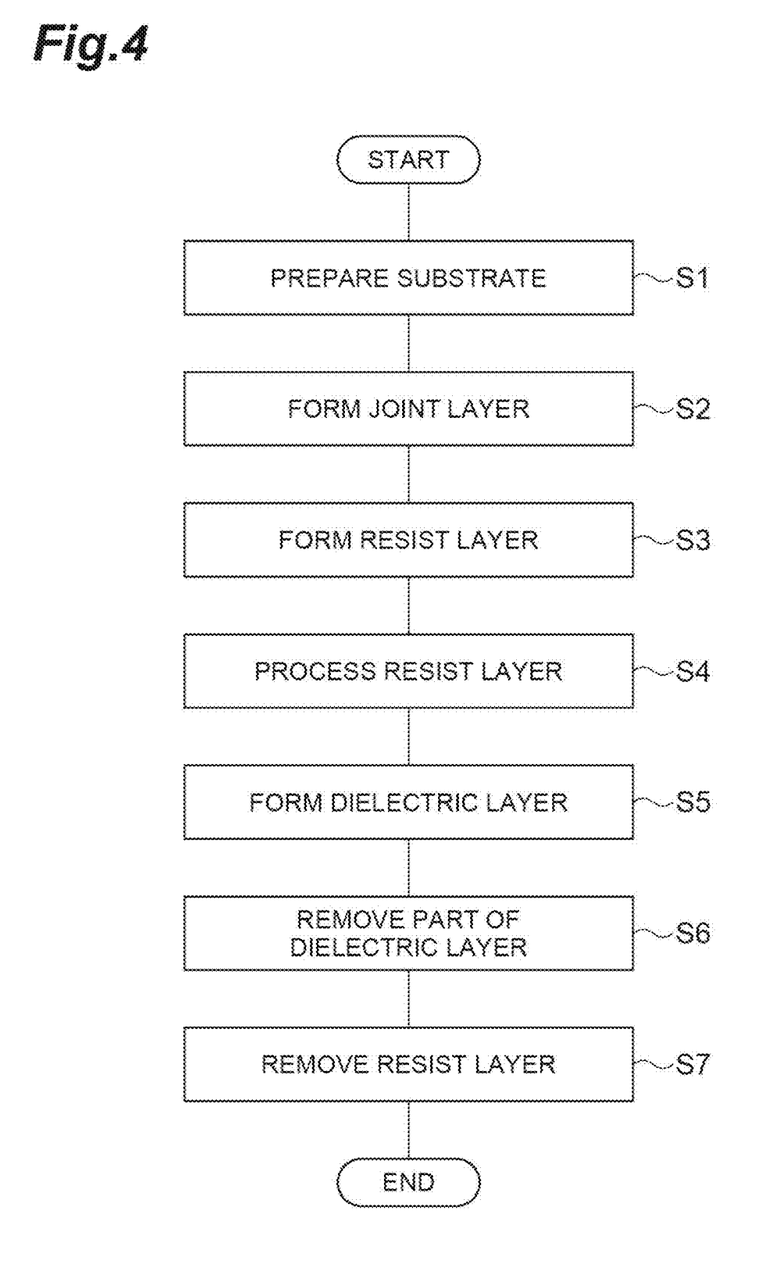
FIG. 4 is a flowchart illustrating a method for producing an optical element.

Next, a method for producing the optical element 1 will be described with reference to FIG. 4 and FIGS. 5A to 5I. FIG. 4 is a flowchart illustrating the method for producing an optical element. FIGS. 5A to 5I are views for describing the method for producing an optical element 1.

Figure 5A:
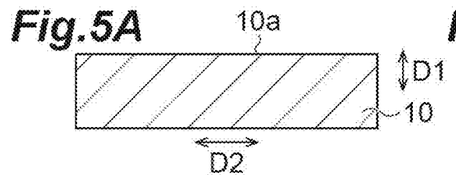
FIG. 5A is a view for describing the method for producing an optical element.

First, the substrate 10 is prepared (process S1). The substrate 10 has the main surface 10a as illustrated in FIG. 5A. The direction D1 is a direction orthogonal to the main surface 10a, and the direction D2 is a direction along the main surface 10a. The substrate 10 has transparency for the above electromagnetic wave to be incident on the optical element 1. The substrate 10 is made of, for example, quartz. For example, the substrate 10 includes quartz glass.

Figure 5B:
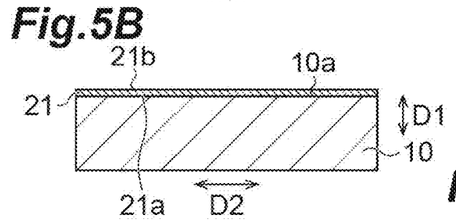
FIG. 5B is a view for describing the method for producing an optical element.

Next, the joint layer 21 is formed on the substrate 10 (process S2). As illustrated in FIG. 5B, the joint layer 21 is disposed on the main surface 10a of the substrate 10. The joint layer 21 formed in process S2 has the first surface 21a facing the main surface 10a of the substrate 10, and the second surface 21b located on the side opposite the first surface 21a. In process S2, the joint layer 21 is formed on the main surface 10a as one continuous layer. The joint layer 21 is formed on the entire surface of the main surface 10a. The joint layer 21 is made of at least one material of hafnium dioxide, titanium dioxide, silicon dioxide, silicon nitride, silicon, and gallium arsenide. The joint layer 21 is formed by applying a coating agent, which includes at least one of hafnium dioxide, titanium dioxide, silicon dioxide, silicon nitride, silicon, and gallium arsenide, on the main surface 10a.

Figure 5C:
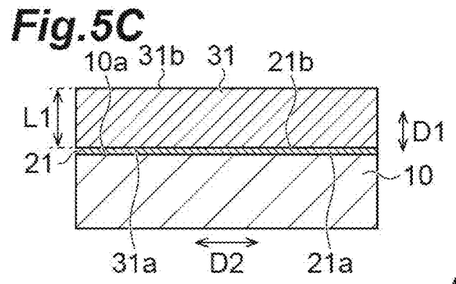
FIG. 5C is a view for describing the method for producing an optical element.

Next, a resist layer 31 is formed on the second surface 21b of the joint layer 21 (process S3). In process S3, as illustrated in FIG. 5C, the resist layer 31 is formed on the second surface 21b of the joint layer 21, as one continuous layer. In process S3, the resist layer 31 has a first surface 31a facing the second surface 21b of the joint layer 21, and a second surface 31b located on a side opposite the first surface 31a. The thickness of the resist layer 31 is determined according to the maximum length L1 of each of the structural bodies 22 to be formed. For example, the thickness of the resist layer 31 is the same as the maximum length L1 of each of the structural bodies 22. "The same" includes a range of production tolerance. The resist layer 31 is made of, for example, an electron beam resist. The resist layer 31 may be made of a photoresist. In process S3, the resist layer 31 is formed, for example, by applying the resist on the main surface 10a using spin coating.

Figure 5D:
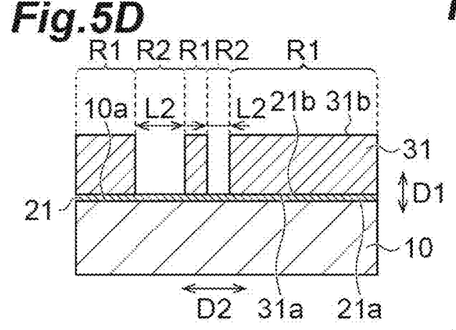
FIG. 5D is a view for describing the method for producing an optical element.

Next, the resist layer 31 is processed (process S4). As illustrated in FIG. 5D, the resist layer 31 is processed such that a pattern penetrating through the resist layer 31 from the second surface 31b to the first surface 31a is formed. A first portion R1 which is covered with the resist layer 31 and a second portion R2 in which the second surface 21b of the joint layer 21 is exposed from the resist layer 31 are formed in the second surface 21b of the joint layer 21 by the processing. The second portion R2 is a portion obtained by removing the first portion R1 from the second surface 21b.

In process S4, the resist layer 31 is processed, for example, by exposure and development by electron beam lithography. When the resist layer 31 is formed of a photoresist, the resist layer 31 is processed by exposure and development by photolithography. The maximum width of the second portion R2 in the direction D2 is determined according to the maximum length L2 of each of the structural bodies 22 to be formed. In the present embodiment, the maximum width of the second portion R2 in the direction D2 is the maximum length L2 and is, for example, 200 nm or less.

Figure 5E:
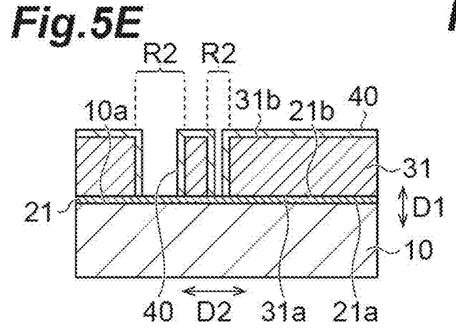
FIG. 5E is a view for describing the method for producing an optical element.

Next, a dielectric 40 is deposited in a state where the resist layer 31 processed is provided on the second surface 21b of the joint layer 21, to form a dielectric layer 41 (process S5). The dielectric 40 is laminated on the resist layer 31 and the second portion R2. The dielectric layer 41 covers the second portion R2, and is in contact with the resist layer 31. The length of the dielectric layer 41 in the direction D1, which is formed on the second portion R2, is longer than the length of the resist layer 31 in the direction D1. In other words, the dielectric 40 is deposited to be thicker in the second portion R2 than the thickness of the resist layer 31 in the direction D1.

Figure 5F:
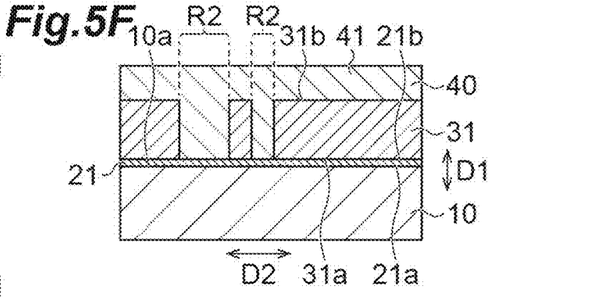
FIG. 5F is a view for describing the method for producing an optical element.

The dielectric 40 is deposited from a side in contact with the main surface 10a of the substrate 10, for example, by vapor thin film deposition. For example, atomic layer deposition (ALD) is used as the vapor thin film deposition. For example, chemical vapor deposition (CVD) is used as the vapor thin film deposition. In the present embodiment, as illustrated in FIG. 5E, the dielectric 40 is laminated on the resist layer 31 and the second portion R2 of the joint layer 21 from the side, which is in contact with the second surface 21b, by the atomic layer deposition. In process S5, the dielectric 40 is laminated until at least the second surface 21b of the joint layer 21 and the resist layer 31 are not visible. The process of laminating the dielectric 40 is continued to form the dielectric layer 41 as illustrated in FIG. 5F. The dielectric layer 41 formed covers the resist layer 31 and the joint layer 21. The dielectric 40 includes, for example, at least one of hafnium dioxide, titanium dioxide, silicon dioxide, silicon nitride, silicon, and gallium arsenide. For example, the joint layer 21 and the dielectric layer are made of the same material. In the present embodiment, the dielectric layer 41 is laminated on the resist layer 31 and the second portion R2 of the joint layer 21 at a film deposition temperature of approximately 170° C.

Figure 5G:
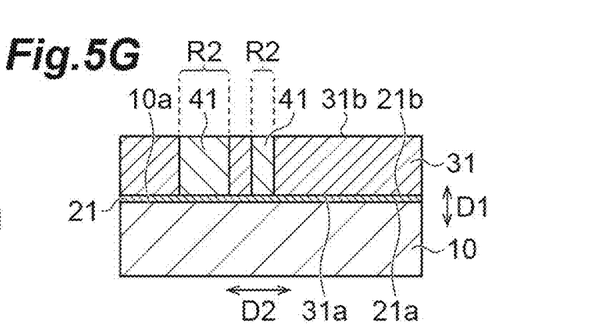
FIG. 5G is a view for describing the method for producing an optical element.

Next, a part of the dielectric layer 41 is removed (process S6). As illustrated in FIG. 5G a part of the dielectric layer 41 is removed such that the second surface 31b of the resist layer 31 and the dielectric layer 41 are flush with each other. When an unnecessary portion of the dielectric layer 41 is removed in such a manner, the dielectric layer 41 remains only in a portion overlapping the second portion R2 of the joint layer 21, as viewed in the direction D1 orthogonal to the main surface 10a of the substrate 10. In process S6, the dielectric layer 41 is removed, for example, by etching. For example, dry etching is used as the etching. For example, reactive ion etching (RIE) is used as the dry etching. For example, an inductively coupled plasma is used in the reactive ion etching.

Figure 5H:
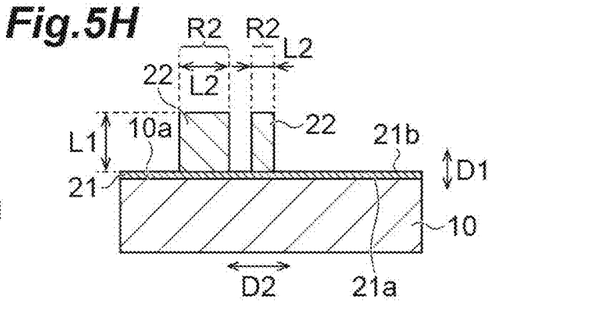
FIG. 5H is a view for describing the method for producing an optical element.

Next, the resist layer 31 is removed (process S7). As illustrated in FIG. 5H, the resist layer 31 disposed on the joint layer 21 is completely removed. In process S7, the resist layer 31 is removed, for example, by a resist stripping process (ashing). For example, oxygen plasma ashing is used as the resist stripping process.

By the removal of the resist layer 31, the plurality of structural bodies 22 made of the dielectric 40 are formed on the second portion R2 of the joint layer 21. The metamaterial 20 is formed by the plurality of structural bodies 22 and the joint layer 21 on which each of the plurality of structural bodies 22 is provided. In process S7, in the metamaterial 20, the joint layers 21 on which the structural bodies 22 adjacent to each other are provided are formed to be continuous with each other.

In steps S1 to process S7 described above, each of the structural bodies 22 is formed in a column shape extending from the second surface 21b of the joint layer 21 in the direction D1 intersecting the second surface 21b. The plurality of structural bodies 22 are formed to be two-dimensionally arranged on the second surface 21b of the joint layer 21. Each of the structural bodies 22 is formed such that the maximum length L2 of each of the structural bodies 22 in the direction D2 along the second surface 21b of the joint layer 21 is 200 nm or less. Each of the structural bodies 22 is formed such that the ratio of the maximum length L2 of each of the structural bodies 22 in the direction D2 to the maximum length L1 of each of the structural bodies 22 in the direction D1 is from 0.06 to 0.40. The joint layer 21 and the structural body 22 are made of the same material.

Figure 5I:
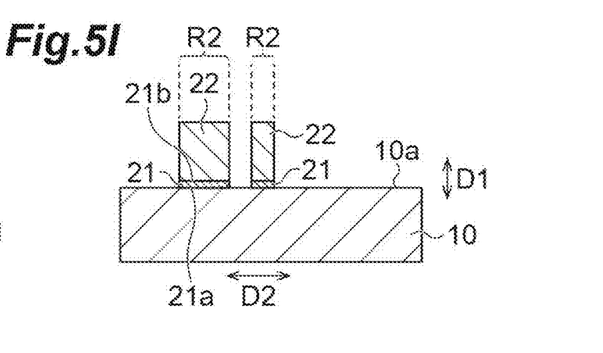
FIG. 5I is a view for describing the method for producing an optical element.

As a modification example of the present embodiment, as illustrated in FIG. 5I, a part of the joint layer 21 may be removed after process S7. In this case, a portion of the joint layer 21 formed in process S2 is remained, the portion being in contact with at least each of the structural bodies 22. The joint layer 21 which is remained connects each of the structural bodies 22 and the substrate 10. For example, a part of the joint layer 21 may be removed by providing a protective film on each of the structural bodies 22 and performing etching. In this case, the joint layers 21 on which the structural bodies 22 adjacent to each other are provided may be formed to be separated from each other. As illustrated in FIG. 5I, the side surface of the structural body 22 and the joint layer 21 may be formed to be flush with each other in the direction D1. As another modification example, a step may be provided between the side surface of the structural body 22 and the joint layer 21.

Next, the effects of the method for producing the optical element 1 and the optical element 1 described above will be described.

Figure 6:
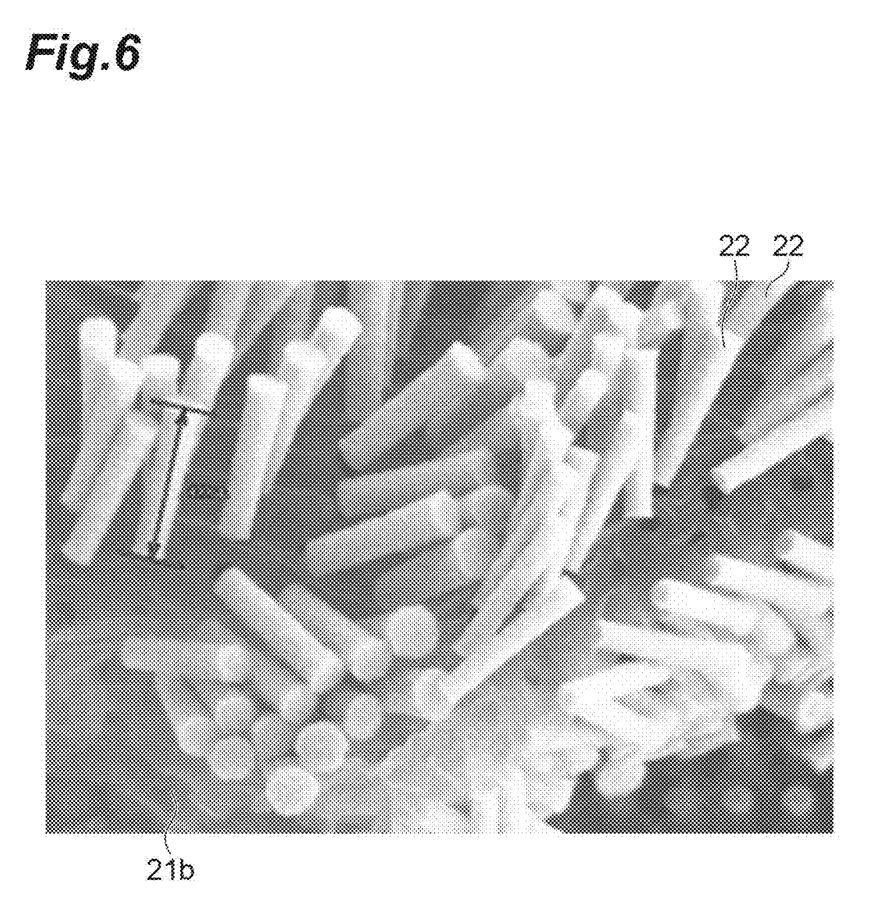
FIG. 6 is an image illustrating a state where a defect is generated in a microstructure.

When a desired microstructure is formed in a configuration where the plurality of structural bodies 22 are directly formed on the substrate 10, the resist layer 31 is directly formed on the substrate 10 and is processed. The dielectric 40 is directly laminated on the main surface 10a of the substrate 10, which is exposed. In this case, when the resist layer 31 is removed, the structure of the plurality of structural bodies 22 in the second portion R2 collapses. For example, in a case where the microstructure is directly formed on the substrate 10 by the plurality of structural bodies 22, when the resist layer 31 is removed, as illustrated in FIG. 6, defects such as separation of the structural body 22 from the substrate 10 and the falling of the structural body 22 are generated. Namely, the microstructure of the plurality of structural bodies 22 collapses.

In the method for producing the optical element 1, the joint layer 21 is disposed on the substrate 10, and the plurality of structural bodies 22 made of the dielectric 40 are formed on the second surface 21b of the joint layer 21. In this case, when the resist layer 31 is removed, as compared to when the plurality of structural bodies 22 are directly formed on the substrate 10, the collapse of a structure formed by the plurality of structural bodies 22 is further suppressed. The further the collapse of the structure formed by the plurality of structural bodies is suppressed, the further the reliability and the production throughput of the optical element are improved. Therefore, according to the production method, while both the reliability and the production throughput of the optical element 1 produced are achieved, various microstructures using the dielectric in the optical element 1 can be realized.

In the optical element 1, the joint layer 21 is disposed on the substrate 10, and the plurality of structural bodies 22 made of the dielectric are formed on the second surface 21b of the joint layer 21. According to the configuration, the collapse of the structure formed by the plurality of structural bodies 22 is further suppressed than in the configuration where the plurality of structural bodies 22 are directly disposed on the substrate 10. Therefore, the optical element 1 has a configuration where a desired microstructure using the dielectric can be realized while both the reliability and the production throughput are achieved.

Each of the structural bodies 22 is formed in a column shape extending from the second surface 21b in the direction D1 intersecting the second surface 21b. Each of the structural bodies 22 is formed such that the maximum length L2 of each of the structural bodies 22 in the direction D2 along the second surface 21b is 200 nm. Each of the structural bodies 22 is formed such that the ratio of the maximum length L2 of each of the structural bodies 22 in the direction D2 along the second surface 21b to the maximum length L1 of the structural bodies 22 in the direction D1 is from 0.06 to 0.40. In this case, while the reliability and the production throughput of the optical element 1 produced are secured, various microstructures according to a desired optical performance can be realized.

The plurality of structural bodies 22 are formed to be two-dimensionally arranged on the second surface 21b. In the metamaterial 20, the joint layers 21 on which the structural bodies 22 adjacent to each other are provided are formed to be continuous with each other. In this case, the collapse of the structure formed by the plurality of structural bodies 22 is easily suppressed.

The joint layer 21 is made of at least one of hafnium dioxide, titanium dioxide, silicon dioxide, silicon nitride, silicon, and gallium arsenide. Each of the structural bodies 22 is made of at least one of hafnium dioxide, titanium dioxide, silicon dioxide, silicon nitride, silicon, and gallium arsenide. The joint layer 21 and the structural body 22 are made of the same material. In this case, the collapse of the structure of the plurality of structural bodies 22 is further suppressed, and the reliability and the production throughput are further improved.

The embodiment and the modification examples of the present invention have been described above; however, the present invention is not necessarily limited to the embodiment and the modification examples described above, and various changes can be made without departing from the concept of the present invention.

For example, in the embodiment described above, the metamaterial 20 is configured to include the joint layer 21 and the plurality of structural bodies 22. The metamaterial 20 may include a substance other than the joint layer 21 and the plurality of structural bodies 22. The substance may be provided on the surface of the joint layer 21 or the plurality of structural bodies 22, or may be provided inside at least one of the joint layers 21 and the plurality of structural bodies 22. The substance may be a dielectric, or may not be a dielectric.

In the embodiment described above, the optical element 1 includes the substrate 10. However, the optical element 1 may not include the substrate 10. For example, the optical element 1 may include only the metamaterial 20. The optical element 1 may include only the joint layer 21 and the plurality of structural bodies 22. In this case, for example, the optical element 1 may be produced by removing the resist layer 31 as illustrated in FIG. 5H, and then removing the substrate 10 from the joint layer 21. In this case, between process S1 and process S2 described above, another layer may be formed between the substrate 10 and the joint layer 21.

What is claimed is:

1. A method for producing an optical element, the method comprising:
    forming a joint layer on a substrate, the joint layer having a first surface facing the substrate, and a second surface located on a side opposite the first surface;
    forming a resist layer on the second surface of the joint layer to form a first portion and a second portion in the second surface, the first portion being covered with the resist layer, and the second portion being exposed from the resist layer;
    depositing a dielectric in a state where the resist layer is provided on the second surface, to form a dielectric layer that covers the second portion and is in contact with the resist layer; and
    removing the resist layer after the dielectric layer is formed, to form on the second surface of the joint layer a plurality of structural bodies made of the dielectric,
    wherein the joint layer and the structural body are made of the same material.

2. The method for producing an optical element according to claim 1,
    wherein each of the structural bodies is formed in a column shape extending from the second surface in a first direction intersecting the second surface.

3. The method for producing an optical element according to claim 1,
    wherein each of the structural bodies is formed such that a maximum length of each of the structural bodies in a second direction along the second surface is 200 nm or less.

4. The method for producing an optical element according to claim 1,
    wherein each of the structural bodies is formed such that a ratio of a maximum length of each of the structural bodies in a second direction along the second surface to a maximum length of the structural body in a first direction intersecting the second surface is from 0.06 to 0.40.

5. The method for producing an optical element according to claim 1,
    wherein the plurality of structural bodies are formed to be two-dimensionally arranged on the second surface,
    a metamaterial is formed by the plurality of structural bodies and the joint layer on which each of the plurality of structural bodies is provided, and
    in the metamaterial, the joint layers on which the structural bodies adjacent to each other are provided are formed to be continuous with each other.

6. The method for producing an optical element according to claim 1,
    wherein the substrate is made of quartz.

7. The method for producing an optical element according to claim 1,
    wherein the joint layer is made of at least one of hafnium dioxide, titanium dioxide, silicon dioxide, silicon nitride, silicon, and gallium arsenide, and
    the dielectric includes at least one of hafnium dioxide, titanium dioxide, silicon dioxide, silicon nitride, silicon, and gallium arsenide.

8. An optical element comprising:
    a lens produced according to the method of claim 1.

9. The optical element according to claim 8,
    wherein each of the structural bodies has a column shape extending from the second surface in a first direction intersecting the second surface.

10. The optical element according to claim 8,
    wherein a maximum length of each of the structural bodies in a second direction along the second surface is 200 nm or less.

11. The optical element according to claim 8,
    wherein a ratio of a maximum length of each of the structural bodies in a second direction along the second surface to a maximum length of the structural body in a first direction intersecting the second surface is from 0.06 to 0.40.

12. The optical element according to claim 8,
    wherein the plurality of structural bodies are two-dimensionally arranged on the second surface, and
    the joint layers on which the structural bodies adjacent to each other are provided are continuous with each other.

13. The optical element according to claim 8,
    wherein the substrate includes quartz.

14. The optical element according to claim 8,
    wherein the joint layer includes at least one of hafnium dioxide, titanium dioxide, silicon dioxide, silicon nitride, silicon, and gallium arsenide, and
    each of the structural bodies includes at least one of hafnium dioxide, titanium dioxide, silicon dioxide, silicon nitride, silicon, and gallium arsenide.

* * * * *